US009592563B1

United States Patent
James, Jr.

(10) Patent No.: US 9,592,563 B1
(45) Date of Patent: Mar. 14, 2017

(54) TWO-BLADED TABLE SAW WITH SELECTIVE STATIONARY BLADE

(71) Applicant: Harley D. James, Jr., Hillman, MI (US)

(72) Inventor: Harley D. James, Jr., Hillman, MI (US)

( * ) Notice: Subject to any disclaimer, the term of this patent is extended or adjusted under 35 U.S.C. 154(b) by 0 days.

(21) Appl. No.: 14/803,682

(22) Filed: Jul. 20, 2015

(51) Int. Cl.
| | | |
|---|---|---|
| *B23D 45/14* | (2006.01) | |
| *B27G 19/02* | (2006.01) | |
| *B23D 45/06* | (2006.01) | |
| *B23D 47/04* | (2006.01) | |
| *B27B 5/04* | (2006.01) | |

(52) U.S. Cl.
CPC ........... *B23D 45/146* (2013.01); *B23D 45/06* (2013.01); *B23D 47/045* (2013.01); *B27B 5/04* (2013.01); *B27G 19/02* (2013.01)

(58) Field of Classification Search
CPC ...... B23D 45/06; B23D 47/00; B23D 47/025; B23D 45/061; B23D 45/143; B23D 45/146; Y10T 83/773; Y10T 83/7693; Y10T 83/7726
USPC ........................ 83/477.2, 471.3, 425.2, 425.4
See application file for complete search history.

(56) References Cited

U.S. PATENT DOCUMENTS

| | | | | | |
|---|---|---|---|---|---|
| 1,700,683 | A | * | 1/1929 | Madsen ............... | B23D 45/102 144/133.1 |
| 3,540,498 | A | * | 11/1970 | Thompson ............. | B23D 45/10 144/3.1 |
| 3,665,982 | A | * | 5/1972 | Kvalheim ............ | B23D 45/102 144/245.4 |
| 3,866,502 | A | * | 2/1975 | Brewer, Sr. ............ | B23D 45/06 83/425.3 |
| 4,002,094 | A | * | 1/1977 | Erickson .............. | B23D 45/044 83/471.3 |
| 4,026,173 | A | * | 5/1977 | Livick ..................... | B27B 25/10 83/421 |
| 4,161,974 | A | * | 7/1979 | Patterson ............. | B23D 45/021 108/142 |

(Continued)

FOREIGN PATENT DOCUMENTS

EP    0899069 B1    1/2006

OTHER PUBLICATIONS

Forestry Forum, Corley Edger 21 Junior early model, Forestry Forum Gallery (on-line), www.forestryforum.com/gallery/displayimage.php?album=5906&pid=160476#top_display_media, Jun. 28, 2014, 2 pages, U.S.

*Primary Examiner* — Jason Daniel Prone
*Assistant Examiner* — Richard Crosby, Jr.
(74) *Attorney, Agent, or Firm* — Northern Michigan Patent Law, PLC

(57) ABSTRACT

A table saw having a stationary blade and a parallel moveable blade for straightening uneven dimensional lumber of the type used in cabinetry and other relatively fine woodworking. The table saw has a workpiece support frame with a lateral blade opening allowing the moveable blade to be shifted laterally and adjust the spacing between the blades. Powered feed rollers located above the table are used to clamp and feed a workpiece through the table while preventing kickback. A sacrificial fence including a blade guard recess is associated with the stationary blade, and includes a shutoff switch automatically activated to disable the stationary blade for solo use of the moveable blade.

10 Claims, 4 Drawing Sheets

(56) References Cited

U.S. PATENT DOCUMENTS

| | | | | |
|---|---|---|---|---|
| 4,432,263 | A * | 2/1984 | Kowalchuk | B23Q 3/005 83/438 |
| 4,455,907 | A * | 6/1984 | Bassett | B23D 47/025 83/438 |
| 4,619,163 | A * | 10/1986 | Brown | B23D 45/024 144/245.6 |
| 4,676,130 | A * | 6/1987 | Nutt | B23D 45/021 83/155 |
| 4,846,032 | A * | 7/1989 | Jampathom | B26D 1/245 83/425.2 |
| 4,925,081 | A * | 5/1990 | Vecchi | B65H 23/28 242/615.3 |
| 4,962,685 | A * | 10/1990 | Hagstrom | B23D 45/06 83/397 |
| 5,551,327 | A * | 9/1996 | Hamby | B27B 5/34 83/425.4 |
| 6,578,458 | B1 | 6/2003 | Akram et al. | |
| 7,571,751 | B2 | 8/2009 | Woodford et al. | |
| 8,763,504 | B2 * | 7/2014 | Tardif | B27B 25/10 83/438 |
| 2005/0139056 | A1 * | 6/2005 | Gass | B27B 27/02 83/438 |
| 2006/0101958 | A1 * | 5/2006 | Garcia | B23D 45/062 83/13 |
| 2008/0257124 | A1 * | 10/2008 | Yu | B27B 5/243 83/438 |
| 2009/0165624 | A1 * | 7/2009 | Brown | B23D 47/025 83/477 |
| 2010/0199827 | A1 * | 8/2010 | Colegrove | B26D 7/025 83/651 |
| 2011/0192497 | A1 * | 8/2011 | Clark | B27C 5/04 144/371 |
| 2011/0209592 | A1 * | 9/2011 | Chung | B23D 45/061 83/446 |
| 2013/0333536 | A1 * | 12/2013 | Houlberg | B23D 45/046 83/37 |
| 2015/0174756 | A1 * | 6/2015 | Firth | B25H 1/04 83/477 |

\* cited by examiner

TWO-BLADED TABLE SAW WITH SELECTIVE STATIONARY BLADE

RELATED APPLICATIONS/PRIORITY BENEFIT CLAIM

Not applicable.

FIELD

The subject matter of the present application is in the field of table saws with circular saw blades.

BACKGROUND

Circular blade sawmills using multiple circular saw blades are known, sometimes referred to as "edgers" or "edger mills". Edgers are generally used to take the bark off the edges of fresh-sawn boards, or to straighten crooked boards. "Gang" edgers usually have a pair of spaced circular blades driven on a common shaft with a fixed spacing. "Shifting" edgers also have pairs of spaced blades, but at least one of the blades in the pair can be moved left and right to adjust the blade spacing and thus the width of the board. A chain and gripping mechanism is often used to pull the lumber through the blades.

A good example of a prior art shifting edger is the Corley Junior Edger, manufactured as early as the 1940's by the Corley Manufacturing Company of Chattanooga, Tenn. The Corley Junior Edger had a stationary blade and a movable blade driven on a common shaft.

Two-bladed edger mills are usually mounted on long steel roller frames, and are useful for processing lumber on a commercial scale. Edger mills are not as useful for home hobbyists or small commercial carpenters, who generally use smaller single-bladed table saws.

BRIEF SUMMARY

I have invented a table saw that is useful as both a table saw and an edger for relatively fine work on dimensional lumber, especially for straightening boards used in cabinetry. My table saw has a table with a stationary circular saw blade mounted at one side of the table, and a parallel, independently-driven, moveable circular saw blade at a home position on an opposite side of the table. The home position is the maximum spacing of the moveable blade from the stationary blade, for example about 12.5" inches. The table has a fixed front support edge, a fixed rear support edge, a stationary side support edge associated with the stationary blade, and a moveable side support edge associated with the moveable blade. The support edges define a planar saw table frame with a lateral blade pathway between them, the pathway having a width corresponding to the diameter of the moveable blade. The moveable blade and the moveable side support edge can be moved laterally as a unit in the pathway toward the stationary blade, adjusting the spacing of the blades to trim uneven boards of varying width.

The table saw further includes a pair of height adjustable, powered ("live") feed rollers spaced above the table at the front and rear support edges. The rollers are adjustable downwardly to clamp the board against the saw table frame, and to feed the board longitudinally to the blades from the front to the rear, without kickback.

The stationary side of the table includes a sacrificial fence having a home position spaced outwardly from and parallel to the stationary blade, at a distance equal to the minimum spacing of the moveable and stationary blades. The fence functions as a lumber guide for making fine trimming cuts with the stationary blade, i.e. cuts less than the minimum spacing between the blades. The fence is moveable inwardly toward the stationary blade, and includes a blade recess in the sacrificial material equal to or greater than the blade thickness. The recess receives the blade in a blade-guard position when the fence is moved into contact with the blade. A switch is associated with the fence in the blade-guard position, the switch disabling the stationary blade so that the moveable blade can be used alone in various positions.

These and other features and advantages of the invention will become apparent from the detailed description below, in light of the accompanying drawings.

DETAILED DESCRIPTION

Figure 1:
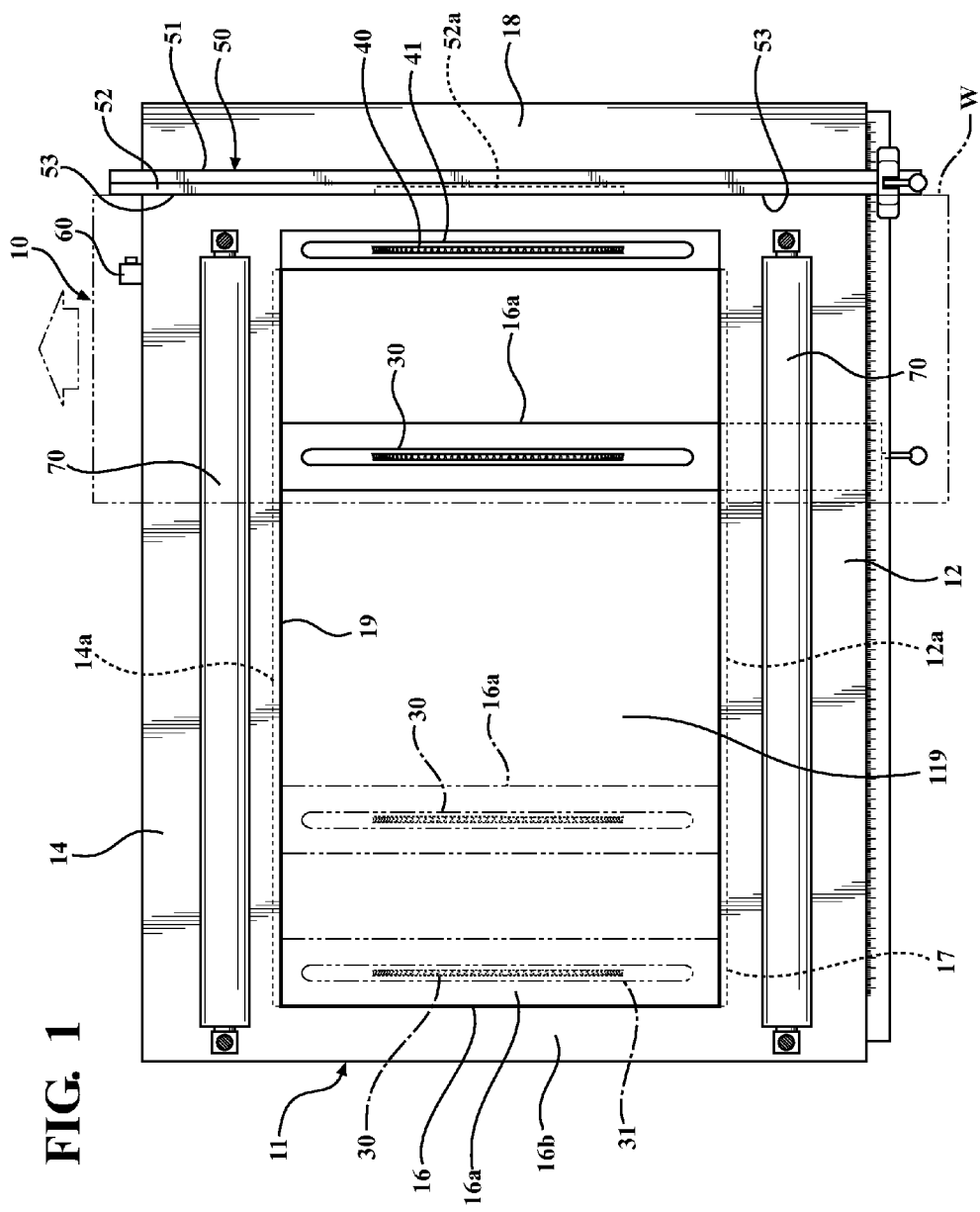
FIG. 1 is a top plan view of an exemplary table saw according to the invention, showing the moveable blade and the fence in different positions using phantom lines.
Figure 2:
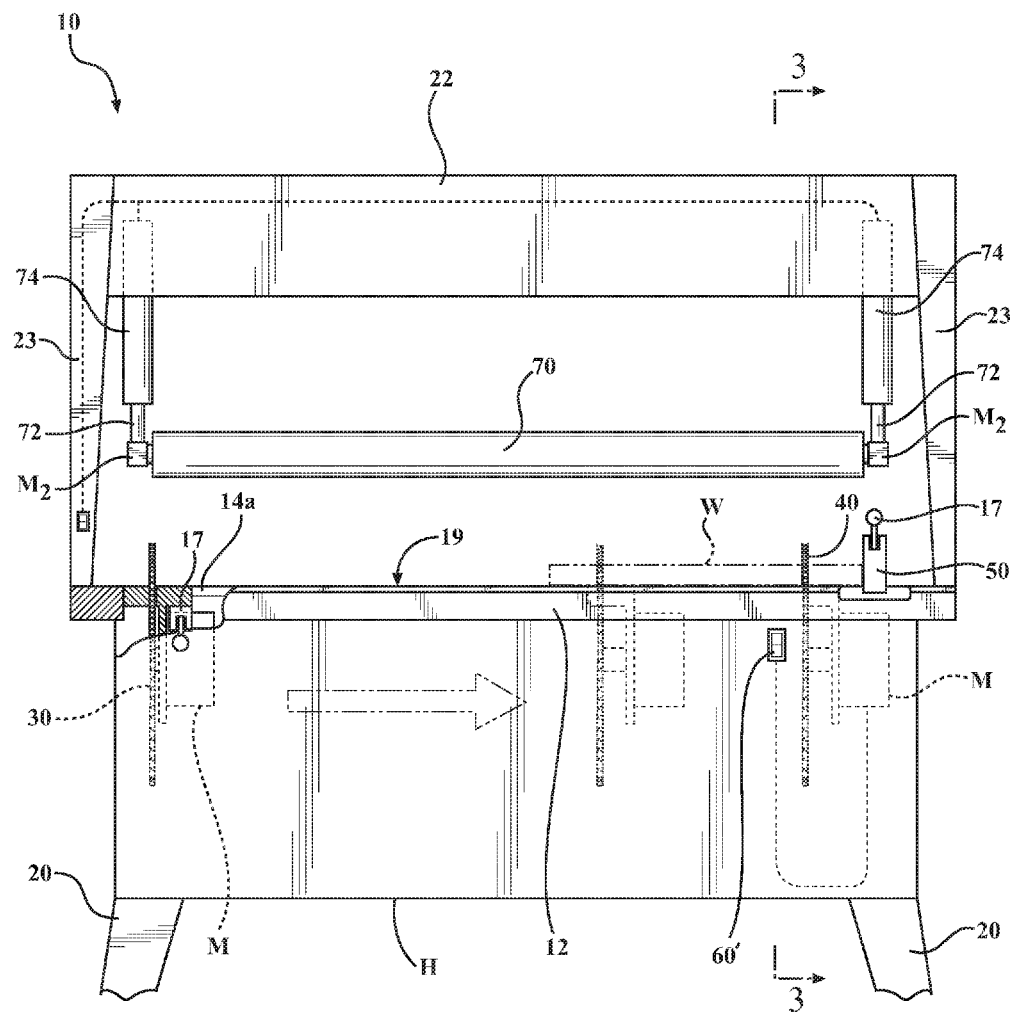
FIG. 2 is a front elevation view of the table saw of FIG. 1, showing the moveable blade, the fence, and the feed rollers in different positions using phantom lines.
Figure 3:
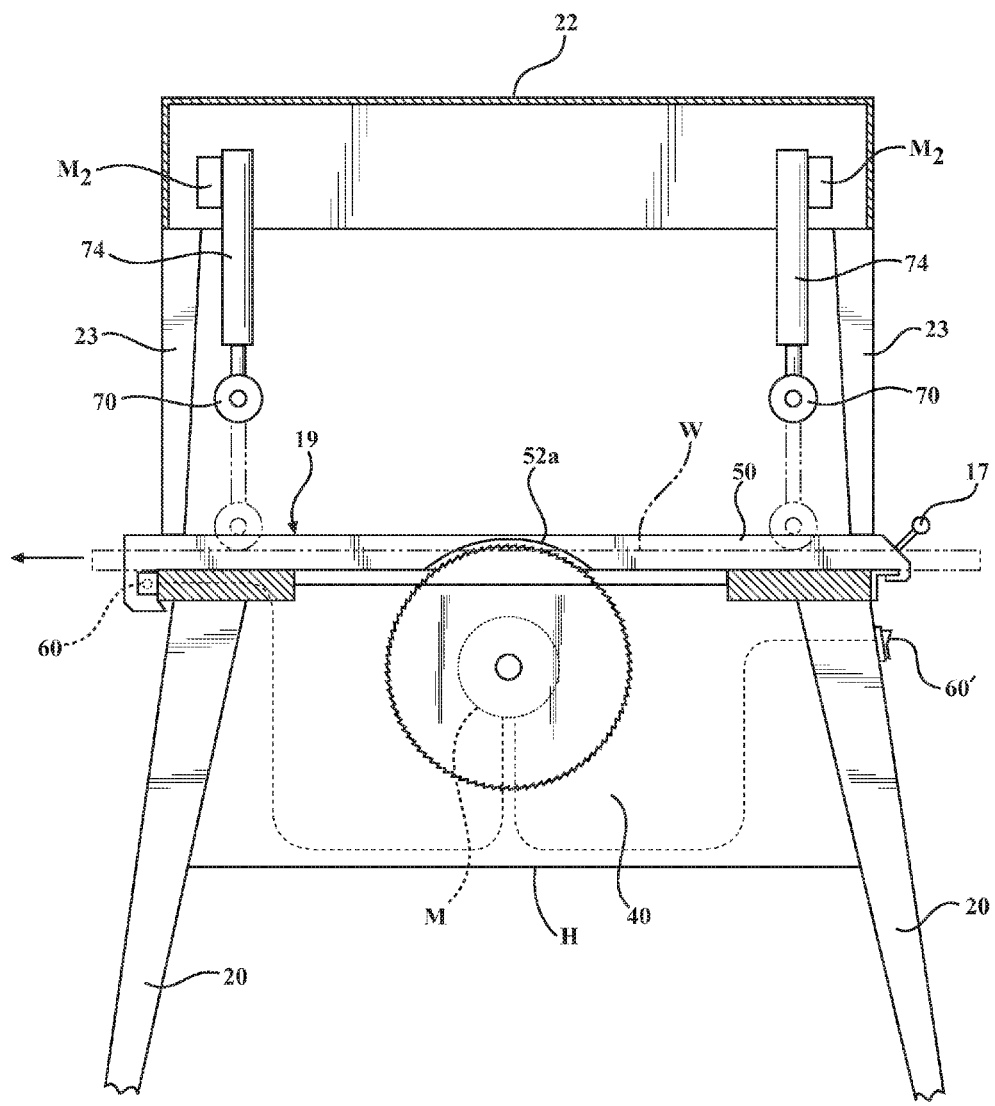
FIG. 3 is a cutaway side view of the table saw of FIG. 1, in particular showing the stationary blade and fence.

Referring to FIGS. 1 through 3, a table saw 10 is shown in exemplary form in order to teach how to make and use the claimed invention. Table saw 10 has a table 11 forming a housing H enclosing two saw blades 30, 40 below an upper work support frame including a front support edge 12, a rear support edge 14, an at least partially moveable side support edge 16, and a stationary side support edge 18. The support edges together define a substantially flat, planar saw table frame or work support surface 19 for supporting dimensional lumber W (FIG. 3) fed through the table from front to rear. The saw table frame 19 in turn defines a lateral blade pathway 119 between the support edges, the pathway defining an open area of travel for a moveable saw blade between sides 16 and 18.

The term "table" should be understood broadly to include not only freestanding tables with their own legs or frames, but also built-in workpiece supporting surfaces, for example built into a cabinet or some other structure in a workshop enclosing or housing the two saw blades. The term "edges" should be understood broadly, generally as the sides of the workpiece supporting frame around the blades and defining the lateral blade pathway, and not limited only to the outermost edge portions of the table's workpiece supporting frame 19. Support edges 12, 14, 16 and 18 may be fairly wide with substantial flat surface area to provide good support for a board being fed through the table saw.

Table 11 may be self-supported on a stand or legs 20, and preferably has a protective hood 22 spaced at least several inches above the table surface. Table 20 may be made from various materials known for such uses, including but not limited to wood and metal. Hood 22 may be transparent, for example made from a plastic such as polycarbonate, and may be height adjustable relative to work surface 19 on its own frame or legs 23. Hood 22 is preferably detachably mounted to the table, for example on hinges, so that it can be swung up and out of the way for access to the blades, when needed.

Table saw 10 also includes a pair of independently driven circular saw blades 30 and 40 of known type, each for example powered by an associated electric motor M and drive shaft of known type, mounted parallel to one another and preferably aligned coaxially. Moveable blade 30 is moveably mounted on the table frame at moveable side support edge 16, while stationary blade 40 is mounted in a fixed position associated with stationary side edge 18. Blades 30 and 40 are parallel to one another in order to make parallel side-straightening cuts on lumber when used in tandem. Both blades extend upwardly through the associated portions of the saw table frame 19, i.e. their respective side support edges, through elongated slots 31, 41, with approximately half or less of the diameter of each blade extending above the work surface 19. Illustrated blades 30 and 40 may be substantially identical in size, as shown.

Moveable blade 30 can be translated laterally across pathway 119 from its home position to a point close to stationary blade 40. For example, the farthest spacing of moveable blade 30 from stationary blade 40 might be approximately 12.5" inches, while the closest spacing might be approximately 1.5" inches. Blade 30 has a diameter less than the front-to-rear width of pathway 19 so that it moves without interference with the front and rear edges of the saw table frame. Moveable side support edge 16 includes an inner portion 16a that moves with blade 30, as in the illustrated example, leaving a stationary portion 16b to better maintain the rigidity of the saw table frame. Optionally, the entire side support edge 16 could move with blade 30. As the moveable portion of side edge 16 moves with blade 30, the effective working width of the saw table frame decreases to accommodate the width of the workpiece W being trimmed.

Various mechanisms can be used to translate blade 30 across the table. In the illustrated example, the moveable portion of moveable side edge 16 (e.g., inner portion 16a) is slidingly mounted at its front and rear ends to lateral slots 12a and 14a in the inner (pathway-facing) edges of front and rear side support edges 12 and 14. Alternately, moveable side edge 16 and blade 30 could be mounted on a carriage slidingly mounted to the undersides of front and rear support edges 12 and 14, or to an extendable drive shaft, or some other known type of mechanism for translating the support edge 16 and blade 30 back and forth across the width of the table. Motor M driving blade 30 may be mounted to move with blade 30, or could be located in a fixed position with an elongated or extendable drive shaft accommodating the movement of the blade relative to the motor.

Various mechanisms can also be used to lock moveable blade 30 and its moveable portion of side edge 16 in a desired adjusted position. For example, where side edge 16 is passive, i.e. moved by the operator manually, a mechanical securing device 17 such as common slide locks (thumb-screw, cam handle, etc.) used in conventional adjustable table saw fences can be used to lock blade 30 and side edge 16 to the front and/or rear support edges 12, 14 at the desired spacing from stationary blade 40.

A sacrificial guide fence 50 is associated with stationary blade 40, located outwardly of the blade at stationary side support edge 18. Fence 50 is "sacrificial" in the sense that it preferably includes an outer guide 51 and an inner layer or surface 52 made from a sacrificial material softer than the blade 40, preventing blade damage in the event of contact, and capable of being replaced at intervals as it wears down.

For example, sacrificial inner layer 52 may be made from a flat piece of wood, screwed or clamped to an outer metal guide portion 51 of fence 50. Alternately, the fence 50 could be a solid material whose is protected from damaging contact with the saw blade by positive stops 151 on the outside edge or underside of the table.

Figure 4:
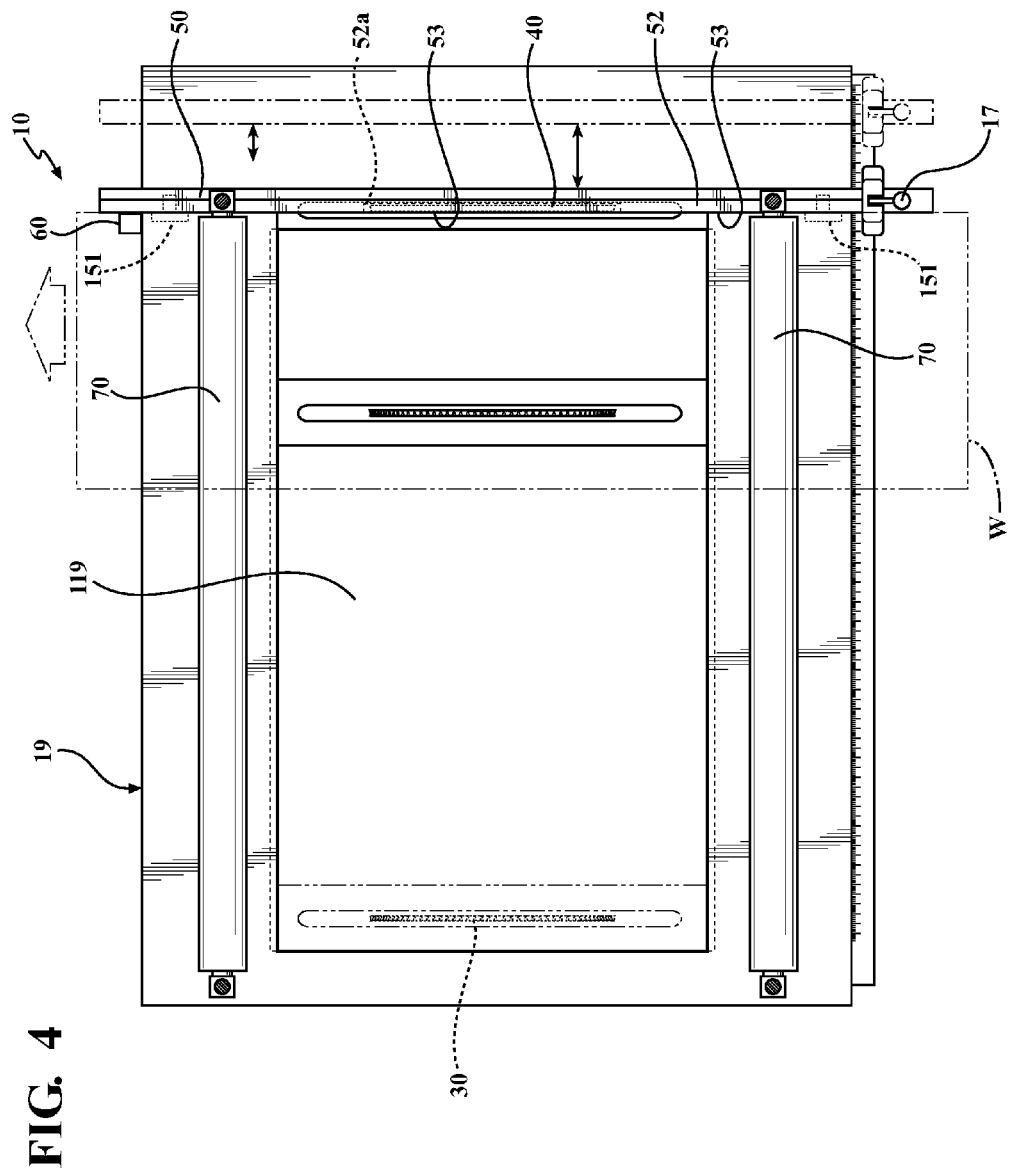
FIG. 4 is a top plan view of the table saw similar to FIG. 1, but showing the the fence moved into a blade guard position disabling the stationary blade.

Fence 50 is laterally moveable from its home position spaced farthest from blade 40 (FIGS. 1-3) to a blade-guard position in which the width of blade 40 is fully contained or shrouded within recess 52a, whether or not the fence is in contact with blade 40 (FIG. 4). For this purpose the inner sacrificial layer 52 of fence 50 includes a recess 52a sized to receive blade 40, i.e. having a length equal to or greater than the diameter of the portion of the blade exposed above the table, and having a depth equal to or greater than the maximum thickness of blade 40 (usually defined by its "kerf"). Recess 52a extends only partway along fence 50, leaving flat workpiece-guiding faces 53 to the front and rear of the recess.

Fence 50 may have a height greater than the height of blade 50 above saw table frame 19, in order to fully shroud the blade, if desired.

The maximum spacing of fence 50 from blade 40 in the fence home position is equal to the minimum spacing between blades 30 and 40, for example 1.5" as mentioned above. The adjustable fence spacing allows a user to make trimming cuts having a width less than the minimum spacing of the moveable and stationary blades 30 and 40, using only the stationary blade and with the advantage of the fence guiding the wood. Fence 50 may be locked into its various adjusted positions by a known mechanism commonly used for table saw fences, such as a clamp 17.

A kill switch 60 is associated with fence 50 in the blade-guard position to disable the stationary blade 40, for example mounted on the saw table frame 19 near the rear end of fence 50. Switch 60 may be a mechanical contact type switch engaged by an end of fence 50, or a photocell switch, or any other known type of switch capable of sensing the presence of a fence 50 in the blade guard position. Switch 60 may be electrically connected to motor M associated with stationary blade 40, or to the motor's power supply, either directly or through an external controller or other circuitry, to interrupt power to the motor M driving blade 40 when the switch is activated. Switch 60 could also be connected to a clutch controller mechanism that disconnects motor M from blade 40, or to any other blade-stopping mechanism or system that disables blade 40 when fence 50 is in the blade-guard position.

When switch 60 is activated to turn off stationary blade 40, as best shown in FIG. 4, moveable blade 40 may still run independently, allowing the saw table 10 to be used like a conventional single-bladed table saw, but with the added benefit of a laterally adjustable saw blade. It may be desirable for some circumstances to provide a manually operated kill switch 60' at the front of the saw table, as shown in FIGS. 2 and 3, in order to shut off the stationary blade 40 independently of fence 50.

Saw table 10 also includes one or more powered or "live" feed rollers 70, for example located above the front and rear support edges 12 and 14 as shown and powered to rotate in a feed-through direction by one or more motors M2 schematically shown in FIGS. 2 and 3, connected in a known manner to rotate the rollers, for example with a shaft drive or belt drive. Rollers 70 positively feed lumber L from the front to the rear of the saw table, through one or both blades 40, 50 depending on the cutting mode (single- or double-bladed). Rollers 70 are preferably height adjustable, for example slidably mounted in tandem on vertical supports 72 above the saw table frame 19, and may be covered with a grip-enhancing and/or cushioning material to promote contact with the lumber and/or to protect the lumber's surface finish. The height of rollers 70 can be adjusted to firmly engage and clamp the lumber to the saw table frame 19 and to grip and feed the lumber through the saw blades without "kickback" toward the front of the saw table. Various mechanisms for adjusting and securing the rollers 70 to the desired height and clamping/feeding pressure against the lumber are possible. For example, rollers 70 or their supports 72 may be secured to a vertically-driven carriage, for example one or more hydraulic cylinders or a screw gear carriage schematically illustrated at 74 that allows the rollers 70 to be moved up and down with a crank handle, similar to the crank-driven tubular screw gear height adjustment mechanism on a common wood planer. As shown in FIGS. 1, 2 and 4, the rollers 70 have a length at least equal to the maximum spacing of the moveable blade 30 from the stationary blade 40 such that the rollers are coextensive with the open lateral blade pathway 119 when the moveable blade 30 is in the home position.

Description of Operation

In operation, to straighten or trim a typical piece of elongated dimensional lumber workpiece W, for example a 1×6" inch rectangular board with irregular or non-parallel edges, the spacing of moveable blade 30 from stationary blade 40 would be adjusted to less than 6" inches apart, by moving blade 30 from its home position toward blade 40. Once blade 30 and its moveable side edge/support 16a are secured in position using clamp 17, the blades 30 and 40 and the rollers 70 would be turned on. Workpiece W would then be fed into the front roller 70 associated with front support edge 12, the roller grabbing the board, holding it firmly against the saw table frame 19 (initially, front support edge 12), and feeding it to and through the rotating blades so that each blade removes a desired portion of one of the board's side edges. The rear roller 70 would grab the trimmed board L (including the trimmed portions) at the rear of the table to continue feeding it smoothly through the table and to increase the roller force working to prevent kickback of the board. The power of the rear roller 70 also allows the operator to remove his hand from the end of the board as it approaches the front roller 70 to finish the cuts.

It will be understood that the disclosed embodiments represent presently preferred examples of how to make and use the invention, but are intended to enable rather than limit the invention. Variations and modifications of the illustrated examples in the foregoing written specification and drawings may be possible without departing from the scope of the invention. It should further be understood that to the extent the term "invention" is used in the written specification, it is not to be construed as a limiting term as to number of claimed or disclosed inventions or discoveries or the scope of any such invention or discovery, but as a term which has long been conveniently and widely used to describe new and useful improvements in science and the useful arts. The scope of the invention should accordingly be construed by what the above disclosure teaches and suggests to those skilled in the art, and by any claims that the above disclosure supports in this application or in any other application claiming priority to this application.

What is claimed is:

1. A two-bladed table saw comprising:
a single table comprising a saw blade housing enclosing first and second saw blades and further comprising an upper frame defining a planar workpiece supporting surface;
the first saw blade comprising a stationary circular saw blade mounted in the housing at a first side of the table with a portion extending from the housing above the planar workpiece supporting surface;
the second saw blade comprising a parallel, independently-driven, laterally moveable circular saw blade mounted in the housing with a portion extending from the housing above the planar workpiece supporting surface, the moveable blade coaxial with the stationary blade and having a home position at an opposite second side of the table, the home position defining a maximum spacing of the moveable blade from the stationary blade;
the planar workpiece supporting surface comprising a front support edge, a rear support edge, a stationary side support edge associated with the stationary blade, and a moveable side support edge associated with the moveable blade in the home position and including a moveable portion moveable away from the home position and the moveable side support edge with the moveable blade;
the front, rear, stationary side and moveable side support edges defining a frame with an open lateral blade pathway in the planar workpiece supporting surface of the table between the front, rear, stationary side and moveable side support edges, the open lateral blade pathway defining an open area of travel for the moveable saw blade and the moveable portion of the moveable side support edge in the workpiece supporting surface between the stationary and moveable side support edges, the open lateral blade pathway further having a front-to-rear width between the front and rear support edges greater than the diameter of the moveable blade; wherein,
the moveable blade and the moveable portion of the moveable side support edge are mounted on the table for lateral movement together as a unit in the open lateral blade pathway between the home position and an away position defining a minimum spacing between the moveable blade and the stationary blade, the movement of the moveable blade and the moveable portion of the moveable side support edge toward the away position reducing the width of the open lateral blade pathway between the moveable and stationary blades.

2. The table saw of claim 1, further comprising front and rear height adjustable powered rotating feed rollers spaced above the planar workpiece supporting frame and aligned with the front and rear support edges, respectively, the rollers adjustable downwardly to clamp a workpiece against the planar workpiece supporting frame and driven to rotate simultaneously in a direction to feed the workpiece from the front support edge to the rear support edge without kickback, the rollers having a length at least equal to the maximum spacing of the moveable blade from the stationary blade such that the rollers are coextensive with the continuously open lateral blade pathway when the moveable blade is in the home position.

3. The table saw of claim 1, wherein the stationary side support edge includes a moveable fence parallel to the stationary blade, the stationary side support edge having an outer side located outwardly away from the moveable blade relative to the stationary blade and the open lateral blade pathway and the fence having a fence home position located on the outer side of the stationary support edge and spaced outwardly from the stationary blade a maximum distance approximately equal to the minimum spacing of the moveable and stationary blades, the fence mounted on the table for lateral movement inwardly from the fence home position toward the stationary blade to a blade guard position, the fence including a blade recess on an inner face facing the stationary blade for receiving the stationary blade in the blade guard position to a depth at least equal to the stationary blade thickness, the fence further having a height greater than a height of the stationary blade above the planar workpiece supporting surface, and the table further including a switch means activated by the fence in the blade guard position to disable the stationary blade.

4. The table saw of claim 3, wherein the blade guard recess has a length approximating the diameter of the stationary blade, and wherein the fence has a length greater than the diameter of the stationary blade and the inner face comprises front and rear workpiece guide surfaces forwardly and rearwardly of the blade recess.

5. The table saw of claim 1, wherein the moveable portion of the moveable side support edge defines a moveable portion of the planar workpiece supporting surface on both sides of the moveable blade.

6. The table saw of claim 1, further comprising a hood mounted on the table above the planar workpiece supporting surface.

7. The table saw of claim 3, the fence further having a height greater than a height of the blade recess such that an upper surface of the fence above the blade recess covers the stationary blade when the fence is in the blade guard position.

8. The table saw of claim 3, wherein the inner face of the fence further comprises a sacrificial inner surface facing the stationary blade and comprising a material softer than the stationary blade, the sacrificial inner surface being removably attached to the fence.

9. The table saw of claim 1, wherein the moveable portion is coplanar with the moveable side support edge and forms a portion of the planar workpiece supporting surface.

10. The table saw of claim 1, wherein the front, rear, stationary side and moveable side support edges define a frame with a continuously open lateral blade pathway in the plane of the planar workpiece supporting surface of the table between the front, rear, stationary side and moveable side support edges, the continuously open lateral blade pathway defining an open and continuous area of travel for the moveable saw blade and the moveable portion of the moveable side support edge in the plane of the planar workpiece supporting surface between and coplanar with the stationary and moveable side support edges, the continuously open lateral blade pathway further having a front-to-rear width between the front and rear support edges greater than the diameter of the moveable blade.

* * * * *